3,060,197
PROCESS FOR THE PRODUCTION OF DELTA AND EPSILON CAPROLACTONES
John E. Anderson, Glenshaw, Norman W. Franke, Penn Hills, and Francis J. Streliec, Springdale, Pa., assignors to Gulf Research & Development Company, Pittsburgh, Pa., a corporation of Delaware
No Drawing. Filed Sept. 14, 1959, Ser. No. 839,568
5 Claims. (Cl. 260—343)

This invention relates to a process for preparing lactones, particularly to a process for preparing lactones by the reaction of a substituted cyclic ether or a substituted diol with carbon monoxide in the presence of an acid catalyst such as sulfuric acid.

The substituted cyclic ether which is reacted with carbon monoxide in accordance with our invention can be represented by the following general structural formula:

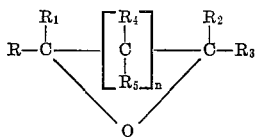

The substituted diol which is reacted with carbon monoxide in accordance with our invention can be represented by the following general structural formula:

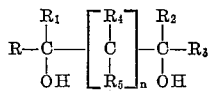

In each of the above structural formulae $n$ can be an integer from one to three. R, $R_1$, $R_2$, $R_3$, $R_4$ or $R_5$ can be hydrogen; an alkyl group having from one to 20 carbon atoms, such as methyl, ethyl, isopropyl, etc.; an aralkyl group having from 7 to 27 carbon atoms, such as benzyl, phenyl ethyl, phenyl isopropyl, etc.; an aryl group having from 6 to 14 carbon atoms, such as phenyl, naphthyl, phenanthryl, etc.; or an alkaryl group having from 7 to 20 carbon atoms, such as tolyl, xylyl, cumyl, etc., with at least one of said R, $R_1$, $R_2$, $R_3$, $R_4$ or $R_5$ groups being an alkyl, aralkyl, aryl or an alkaryl group. Cyclic ethers or diols embraced by the above structural formulae in which each of said R, $R_1$, $R_2$, $R_3$, $R_4$ or $R_5$ groups are hydrogen can not be employed in the process of this invention. Substituted cyclic ethers which can thus be employed include 1,3-epoxybutane; 3-methyl-1,3-epoxybutane; 2-methyltetrahydrofuran; 2,2-dimethyltetrahydrofuran; 2,5-dimethyltetrahydrofuran; 2,2,5,5-tetramethyltetrahydrofuran; 2,6-dimethyltetrahydropyran; 2,2,4-trimethyltetrahydropyran; 2,2,6-triethyltetrahydropyran, etc. Substituted diols which can thus be employed include 2,4-pentanediol; 2,5-hexanediol; 2,5-dimethyl-2,5-hexanediol; 1,3-butanediol; 1,4-pentanediol; 3,5-dimethyl-1,5-hexanediol; 2-methyl-2,6-octanediol, etc.

Since the present reaction is one in which the carbon monoxide adds to the reactant substituted cyclic ether or substituted diol and becomes a member of the ring in the product lactone, the reactants are preferably employed in approximately stoichiometric amounts. If desired, however, the molar ratio of substituted cyclic ether or substituted diol to carbon monoxide can be varied over a wide range, for example, about 1:2 to about 1:5. The carbon monoxide gas stream must contain at least about 50 percent by volume, preferably about 90 to about 100 percent by volume of carbon monoxide. Other materials which may be present, for example, nitrogen, must be substantially inert under the reaction conditions.

The reaction must be carried out in the presence of an acid catalyst. The preferred catalyst is sulfuric acid which must have a concentration of at least about 80 percent by weight. Other acid catalysts which can be used include anhydrous hydrofluoric acid, boron fluoride, boron fluoride-phosphoric acid complex, boron trifluoride-sulfuric acid complex, etc. Not only must the strength of the acid catalyst be within the defined range at the beginning of the reaction, but such strength must be maintained throughout the reaction period. This can be done, for example, particularly when a substituted diol is reacted with carbon monoxide and dilution of the acid catalyst is accelerated as a result of the formation of water, by continuously adding sufficient fresh acid catalyst to the reaction mixture throughout the reaction period. The amount of acid catalyst required relative to total moles of reactants employed is about 1:1 to about 10:1, preferably at least about 3:1 to about 5:1.

The pressure is not critical but desirably is maintained above about 500 pounds per square inch gauge, preferably about 750 to about 1500 pounds per square inch gauge. The reaction temperature is critical, however, and must be about 0° to about 75° C., preferably about 10° to about 50° C. At a temperature below about 0° C. the reaction is too slow to be practical, while at temperatures in excess of about 75° C. the acid catalyst, particularly sulfuric acid, causes charring of the organic reactant and/or product lactone.

Under the conditions set forth in detail above, the present reaction can be carried out in any convenient manner. Thus, the required amount of catalyst can first be charged to the reactor and thereafter carbon monoxide can be added to maintain the desired pressure. The cyclic ether or diol is then introduced into the reactor. The reactants are maintained at the desired temperature and pressure for about 3 minutes to about 10 hours. The product can be treated in any conventional manner to recover the desired lactone. Thus, the reaction product can be extracted with any suitable solvent for the lactone. The extractant can thereafter be treated at any suitable temperature and pressure, for example, about 0° to about 400° C. and about one to about 1000 mm. of Hg to drive off the solvent and leave behind the desired lactone.

The lactones prepared in accordance with the process of this invention can be used in perfumes, paints, or as intermediates for the synthesis of plasticizers, synthetic fibers, etc.

The invention can further be illustrated by reference to the following examples. Examples I and II below illustrate the reaction between specific substituted cyclic ethers and carbon monoxide.

*Example 1*

Into an autoclave equipped with a stirrer there was placed 252 milliliters of sulfuric acid having a concentration of 96 percent by weight. The autoclave was thereafter pressured to 1000 pounds per square inch gauge with 100 grams of carbon monoxide having a purity of 90 percent. This pressure was maintained throughout the reaction period. Eighty-seven milliliters (0.75 mol) of 2,5-dimethyl tetrahydrofuran were introduced into the autoclave at a rate of 0.5 milliliter per minute with stirring. A reaction temperature of 50° C. was maintained in the autoclave by an internal coil. The reaction was permitted to proceed for 180 minutes. The amount of carbon monoxide absorbed by the 2,5-dimethyl tetrahydrofuran, was calculated to be 20.1 grams (0.718 mol). The reaction mixture was drained from the autoclave and poured over wet ice to dilute the acid to about 40 percent by weight concentration, thereby allowing for easier recovery of product. The resulting mixture was extracted with an equal volume of diethyl ether and the procedure repeated three times. The composited extracts were atmospherically distilled at a temperature of 40° C. to remove the diethyl ether. The organic residue was further distilled under a vacuum of 50 millimeters of mercury to recover the product boiling at 152° C. Fifty-five grams, which amounts to a yield of 60 molar percent, of alpha-methyl-delta-caprolactone was recovered.

*Example II*

Into the same autoclave used in Example I there was placed 252 milliliters of sulfuric acid having a concentration of 96 percent by weight. The autoclave was then pressured to 1000 pounds per square inch gauge with carbon monoxide having a purity of 90 percent. 121.5 milliliters of 2,2,5,5 - tetramethyltetrahydrofuran were thereafter pumped into the autoclave. The reaction was permitted to proceed at 1000 pounds per square inch gauge and 50° C. for 200 minutes. The amount of carbon monoxide absorbed was 0.75 mole. The reaction mixture obtained was processed in the same manner as in Example I. 70 grams, representing a 65 percent molar yield of alpha, alpha, delta-trimethyl-delta-caprolactone was recovered.

Example III below shows the reaction of the present invention using a six-membered substituted cyclic ether as the reactant with carbon monoxide.

*Example III*

The procedural steps employed herein in the reaction and in the recovery stage were similar to those employed in Examples I and II. 252 milliliters of sulfuric acid having a concentration of 96 percent by weight 128 milliliters of 2,2,4-trimethyltetrahydropyran and 100 grams of carbon monoxide were employed. The temperature during the reaction was maintained at 50° C. and the pressure 1000 pounds per square inch gauge. Approximately 21 grams (0.75 mol) of carbon monoxide was absorbed by the organic reactant. 63.7 grams, representing a 50 molar yield, of alpha, alpha, gamma-trimethyl-epsilon-caprolactone was obtained.

Example IV below shows the reaction between a diol and carbon monoxide.

*Example IV*

88.5 grams (0.75 mol) of 2,5-hexanediol were pumped into an autoclave containing 4.5 mols of 96 percent by weight sulfuric acid at a reaction temperature of 50° C. and under 1000 pounds per square inch gauge of carbon monoxide. The carbon monoxide absorbed over a period of 160 minutes was approximately one third of the amount absorbed with the corresponding cyclic ether (2,5-dimethyl tetrahydrofuran) of Example I or 6.7 grams of carbon monoxide. A 45 percent molar yield (42.9 grams) of the alpha-methyl-delta-caprolactone was recovered.

That only a substituted cyclic ether as defined in the above structural formulae can be employed in the present process is apparent from an examination of Example V below.

*Example V*

In the manner defined above in Examples I, II and III, 252 milliliters of 96 percent by weight sulfuric acid was placed in an autoclave which was pressured to 1000 pounds per square inch gauge with carbon monoxide having a purity of 90 percent. Sixty-one milliliters of tetrahydrofuran was pumped into the autoclave with stirring. A pressure of 1000 pounds per square inch gauge and a temperature of 50° C. was maintained on the reaction mixture for 200 minutes. No carbon monoxide was found to be absorbed by the tetrahydrofuran.

Obviously, many modifications and variations of the invention, as hereinabove set forth, can be made without departing from the spirit and scope thereof, and therefore only such limitations should be imposed as are indicated in the appended claims.

We claim:

1. A process which comprises reacting a compound selected from the group consisting of a substituted cyclic ether of the formula:

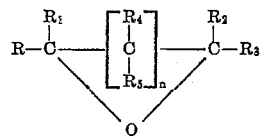

and a substituted diol of the formula:

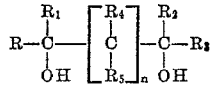

wherein $n$ is an integer from one to 3, R, $R_1$, $R_2$, $R_3$, $R_4$ and $R_5$ is selected from the group consisting of hydrogen, alkyl, aralkyl, aryl and alkaryl, with at least one of said R, $R_1$, $R_2$, $R_3$, $R_4$ and $R_5$ groups being selected from the group consisting of alkyl, aralkyl, aryl and alkaryl, with carbon monoxide in the presence of an acid catalyst selected from the group consisting of sulfuric acid, anhydrous hydrofluoric acid, boron fluoride, boron fluoride-phosphoric acid complex and boron trifluoride-sulfuric acid complex having a concentration of at least about 80 percent by weight at a temperature of about 0° to about 75° C. and thereafter recovering a lactone.

2. A process which comprises reacting a compound selected from the group consisting of a substituted cyclic ether of the formula:

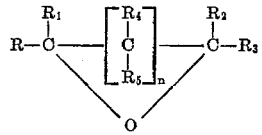

and a substituted diol of the formula:

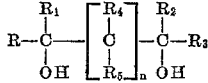

wherein $n$ is an integer from one to 3, R, $R_1$, $R_2$, $R_3$, $R_4$ and $R_5$ is selected from the group consisting of hydrogen, alkyl, aralkyl, aryl and alkaryl, with at least one of said R, $R_1$, $R_2$, $R_3$, $R_4$ and $R_5$ groups being selected from the group consisting of alkyl, aralkyl, aryl and alkaryl, with carbon monoxide in the presence of sulfuric acid having a concentration of at least about 80 percent by weight at a temperature of about 0° to about 75° C. and thereafter recovering a lactone.

3. A process which comprises reacting 2,5-dimethyl tetrahydrofuran with carbon monoxide in the presence of sulfuric acid having a concentration of at least about 80 percent by weight at a temperature of about 0° to about 75° C. and thereafter recovering a lactone.

4. A process which comprises reacting 2,2,5,5-tetramethylhydrofuran with carbon monoxide in the presence of sulfuric acid having a concentration of at least about 80 percent by weight at a temperature of about 0° to about 75° C. and thereafter recovering a lactone.

5. A process which comprises reacting 2,2,4-trimethyltetrahydropyran with carbon monoxide in the presence of sulfuric acid having a concentration of at least about 80 percent by weight at a temperature of about 0° to about 75° C. and thereafter recovering a lactone.

References Cited in the file of this patent

UNITED STATES PATENTS

| | | |
|---|---|---|
| 2,802,023 | Fenske et al. | Aug. 6, 1957 |
| 2,913,489 | De Benedictis et al. | Nov. 17, 1959 |

OTHER REFERENCES

Encyclopedia of Chem. Tech., vol. 6, page 1004, Interscience (1951).